US009516327B2

(12) United States Patent
Wang

(10) Patent No.: US 9,516,327 B2
(45) Date of Patent: Dec. 6, 2016

(54) DATA TRANSMISSION METHOD AND DEVICE

(71) Applicant: Tencent Technology (Shenzhen) Company Limited, Shenzhen, Guangdong Province (CN)

(72) Inventor: Cong Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 7 days.

(21) Appl. No.: 14/418,348

(22) PCT Filed: Aug. 2, 2013

(86) PCT No.: PCT/CN2013/080773

§ 371 (c)(1),
(2) Date: Jan. 29, 2015

(87) PCT Pub. No.: WO2014/023197

PCT Pub. Date: Feb. 13, 2014

(65) Prior Publication Data

US 2015/0222911 A1 Aug. 6, 2015

(30) Foreign Application Priority Data

Aug. 6, 2012 (CN) .......................... 2012 1 0276830

(51) Int. Cl.

| | |
|---|---|
| ***G06K 9/00*** | (2006.01) |
| ***H04N 19/186*** | (2014.01) |
| ***H04N 1/00*** | (2006.01) |
| ***H04N 19/136*** | (2014.01) |
| ***H04N 19/177*** | (2014.01) |

(Continued)

(52) U.S. Cl.

CPC ............. *H04N 19/186* (2014.11); *G06T 7/408* (2013.01); *H04L 67/10* (2013.01); *H04N 1/00347* (2013.01); *H04N 19/136* (2014.11); *H04N 19/177* (2014.11); *H04N 19/44* (2014.11); *H04W 4/18* (2013.01); *G06T 2200/16* (2013.01); *G06T 2207/10024* (2013.01); *G06T 2210/32* (2013.01); *H04N 2201/0065* (2013.01); *H04W 4/206* (2013.01)

(58) Field of Classification Search

CPC .... G06T 2200/16; G06T 7/408; H04W 4/18; H04W 4/206; H04N 19/44; H04N 19/186; H04N 19/177; H04L 67/10; G06F 17/30247; G06F 17/30265; G06K 9/00; G06K 15/40

USPC .......................................................... 382/166

See application file for complete search history.

(56) References Cited

U.S. PATENT DOCUMENTS

| | | | | | |
|---|---|---|---|---|---|
| 2007/0115373 | A1* | 5/2007 | Gallagher | G06F 17/30265 | 348/231.3 |
| 2008/0278599 | A1* | 11/2008 | Shiohara | H04N 1/00161 | 348/222.1 |
| 2013/0315445 | A1* | 11/2013 | Schlieski | G06F 17/30247 | 382/103 |
| 2014/0233861 | A1* | 8/2014 | Tan | G06K 15/40 | 382/218 |

* cited by examiner

*Primary Examiner* — Ali Bayat

(57) ABSTRACT

The present invention discloses a data transmission method and device. The method comprises: a first terminal collecting image(s) displayed on a display screen of a second terminal through an image collecting module; wherein the image(s) is (or are) generated by encoding binary data of a file to be transmitted by the second terminal, and displayed on the display screen of the second terminal, and wherein a plurality of color gradations of pixels of the image(s) correspond to corresponding binary data; and the first terminal decoding the collected image(s) to obtain binary data and restoring the corresponding file according to the obtained binary data, thus achieving data transmission between terminals.

17 Claims, 7 Drawing Sheets

(51) Int. Cl.

| | |
|---|---|
| ***H04N 19/44*** | (2014.01) |
| ***G06T 7/40*** | (2006.01) |
| ***H04L 29/08*** | (2006.01) |
| ***H04W 4/18*** | (2009.01) |
| *H04W 4/20* | (2009.01) |

31
32
Encoding Module
Display Module

DATA TRANSMISSION METHOD AND DEVICE

CROSS-REFERENCE TO RELATED APPLICATIONS

This application is the National Stage of, and therefore claims the benefit of, PCT Application No. PCT/CN2013/080773 filed on Aug. 2, 2013, which claims the priority to Chinese Patent Application No. 201210276830.8, entitled "Data Transmission Method and Device", filed with the State Intellectual Property Office of China on Aug. 6, 2012, each of which is herein incorporated by reference in its entirety.

FIELD OF INVENTION

The present invention relates to the field of communication technology, and more particularly to a data transmission method and device.

BACKGROUND

With rapid development of communication technology, terminals have come to acquire increasingly powerful processing functions, and gained significant increase in storage capacity. Demands for data transmission between terminals are also growing. Take mobile phone terminals as example, current data transfer between two mobile phones is mainly achieved via electromagnetic waves (such as Bluetooth, and Wireless Fidelity (Wi-Fi)) and optical waves (such as infrared).

However, the prior solutions for data transmission between terminals have the following problems:

1. data transmission means, such as Bluetooth, Wi-Fi, infrared, etc., require a corresponding communication module to be added to a mobile terminal for supporting data communication.
2. both Bluetooth and Wi-Fi operate in the ISM (Industrial Scientific Medical) band, while the ISM band is an open band, and may be subject to interference from microwave ovens, cordless telephones, scientific research instruments, industrial equipment or medical equipment signals.
3. Wi-Fi requires simultaneous connection to the same AP (Wireless Access Point), whereas many mobile terminals do not support point-to-point connections.
4. some mobile phones do not support infrared transmission any more.

Therefore, a data transmission method is urgently demanded to solve the above problems.

SUMMARY OF THE INVENTION

Embodiments of the present invention provide a data transmission method and device for solving the problem that other communication modules are required for data transmission between prior terminals, as well as the problem of interference with transmission, achieving the convenience and effectiveness of data transmission between terminals.

For such purposes, embodiments of the present invention adopt the following technical solutions.

An embodiment of the present invention provides a data transmission method, comprising:

a first terminal collecting image(s) displayed on a display screen of a second terminal through an image collecting module; wherein the image(s) is (or are) generated by encoding binary data of a file to be transmitted by the second terminal, and displayed on the display screen of the second terminal, and wherein a plurality of color gradations of pixels of the image(s) correspond to corresponding binary data;

the first terminal decoding the collected image(s) to obtain binary data, and restoring the corresponding file according to the obtained binary data.

An embodiment of the present invention also provides a data transmission method, comprising:

a first terminal encoding binary data of a file to be transmitted, and generating image(s) according to an encoding result, wherein a plurality of color gradations of pixels of the image(s) correspond to corresponding binary data;

the first terminal displaying the generated image(s) on a display screen, so that an opposite terminal collects the image(s) through an image collecting module, obtains binary data by decoding the collected image(s), and restores the corresponding file according to the binary data obtained by decoding.

An embodiment of the present invention also provides a terminal, comprising:

an image collecting module configured to collect image(s) displayed on a display screen of an opposite terminal; wherein the image(s) is (or are) generated by encoding binary data of a file to be transmitted by the opposite terminal, and displayed on the display screen of the opposite terminal, and wherein a plurality of color gradations of pixels of the image(s) correspond to corresponding binary data;

a decoding module configured to decode the image(s) collected by the image collecting module to obtain binary data;

a file generating module configured to restore the corresponding file according to the binary data obtained by the decoding module.

An embodiment of the present invention also provides a terminal, comprising:

an encoding module configured to encode binary data of a file to be transmitted, and generate image(s) according to an encoding result, wherein a plurality of color gradations of pixels of the image(s) correspond to corresponding binary data;

a display module configured to display the image(s) generated by the encoding module on a display screen, so that an opposite terminal collects the image(s) through an image collecting module, obtains binary data by decoding the collected image(s), and restores the corresponding file according to the binary data obtained by decoding.

An embodiment of the present invention also provides a method for transmitting a file, comprising:

performing a collecting operation and a decoding operation on each of one or more images sequentially displayed on an output terminal, so as to obtain the decoded data of the one or more images; and obtaining a file to be transmitted according to the decoded data of the one or more images; wherein, the one or more images are generated by encoding the file to be transmitted.

An embodiment of the present invention also provides a method for outputting a file, comprising:

encoding a file to be transmitted to generate one or more images; and sequentially displaying the one or more images, so that a receiving terminal performs a collecting operation and a decoding operation on each of the one or more images to obtain the decoded data of the one or more images, and obtains the file to be transmitted according to the decoded data of the one or more images.

An embodiment of the present invention also provides a receiving terminal, comprising:

a camera, configured to perform a collecting operation on each of one or more images sequentially displayed on an output terminal;

a processor, configured to perform a decoding operation on each of the one or more images, so as to obtain the decoded data of the one or more images; and obtains a file to be transmitted according to the decoded data of the one or more images;

wherein, the one or more images are generated by encoding the file to be transmitted.

An embodiment of the present invention also provides an output terminal, comprising:

a processor, configured to encode a file to be transmitted to generate one or more images; and a display screen, configured to sequentially display the one or more images, so that a receiving terminal performs a collecting operation and a decoding operation on each of the one or more images to obtain the decoded data of the one or more images, and obtains the file to be transmitted according to the decoded data of the one or more images.

According to the method and device for data provided by embodiments of the present invention, a terminal encodes binary data of a file to be transmitted to generate image(s) and displays the image(s) on a display screen, wherein a plurality of color gradations of pixels of the image(s) correspond to corresponding binary data, and an opposite terminal, after collecting the image(s) through an image collecting module, decodes the image(s) to obtain binary data, and restores the corresponding file according to the obtained binary data, thus achieving data transmission between terminals. Embodiments of the present invention do not require any extra communication module to be added to the terminal, saving manufacturing costs; and by collecting image(s) through an image collecting module, avoid the problems of electromagnetic radiation and electromagnetic interference caused by the prior Bluetooth and Wi-Fi transmission means, making operations more convenient and more effective.

DETAILED DESCRIPTION

In the following discussion, a clear and thorough description of the technical solutions in the present invention will be provided by referring to the accompanying drawings in the present invention. Apparently, the embodiments described herein are only part, instead of all, of the embodiments of the present invention. All other embodiments obtained by those of ordinary skill in the art based on the embodiments of the present invention, without cost of creative labor, fall within the scope of protection of the present invention.

An embodiment of the present invention provides a data transmission method applied for transmitting a file between terminals. In an embodiment of the present invention, a terminal 1 transmits a file to a terminal 2, wherein the basic configurations of the terminal 1 and the terminal 2 are that: the terminal 1 has an at least 480*360 pixels, 18-bit true color display screen, and an opposite terminal (the terminal 2) has an image collecting module (for example, a camera) of at least 2 million pixels, wherein the terminal 1 and the terminal 2 may be mobile phones, PCs, televisions, etc. Graphic encoding software for encoding a file to be transmitted into image(s) is installed on the terminal 1, wherein the file to be transmitted may be a file in any format, including: an audio file (such as an audio file in mp3 or way format), a video file (such as a video file in rm, mpeg or avi format), a text file (such as a text file in txt format), etc.; corresponding graphic decoding software for decoding the collected image(s) is installed on the terminal 2. The graphic encoding and decoding software may include: software encoding and decoding images in various formats like bmp, jpg, tif, psd, etc. In embodiments of the present invention, graphic encoding and decoding software supporting the bmp image encoding protocol will be employed.

When the terminal 1 is initialized, the graphic encoding software installed thereon is started; when the terminal 2 is initialized, the graphic decoding software installed thereon is started, and a camera is enabled. If the file to be transmitted needs to be transmitted from the terminal 1 to the terminal 2, the camera of the terminal 2 is adjusted such as to be corresponding to the display screen of the terminal 1, and a distance between the terminal 1 and the terminal 2 is adjusted such that the camera is able to collect clearly the image(s) displayed on the display screen of the terminal 1.

Figure 1:
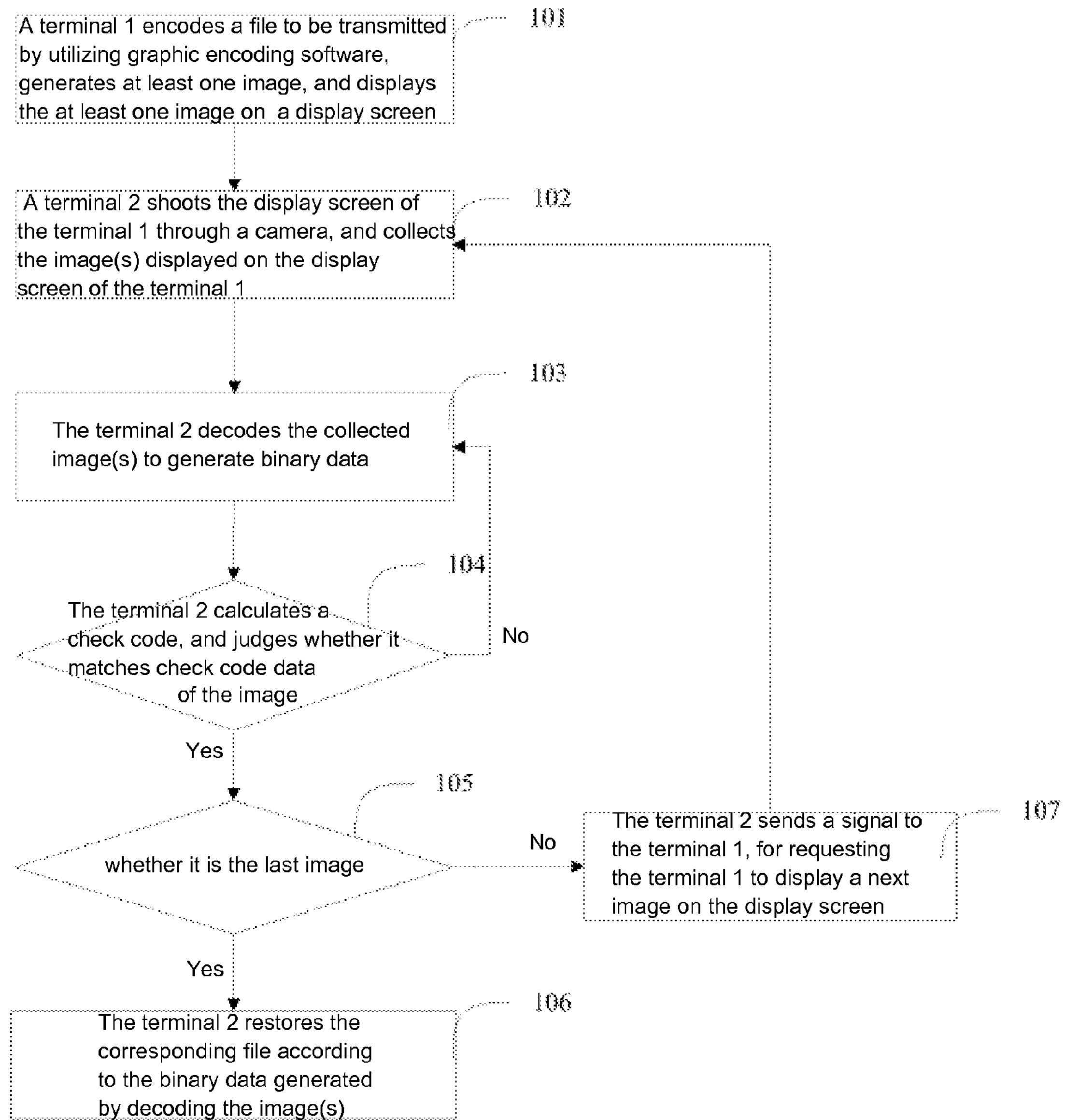
FIG. 1 illustrates a flow diagram of a data transmission method provided by an embodiment of the present invention.

The data transmission procedure provided by an embodiment of the present invention will be described in detail as follows in combination with FIG. 1. As shown in the figure, this procedure comprises the following steps.

At step 101, a terminal 1 encodes a file to be transmitted by utilizing graphic encoding software, generates at least one image, and displays the least one image on a display screen.

Regardless of the file format, the terminal 1 identifies the file as a string of binary data, and encodes the file to be transmitted by utilizing the graphic encoding software to generate an image(s) which is (or are) binary data, wherein a plurality of color gradations of pixels of the image(s) correspond to corresponding binary data. According to the size of the file to be transmitted, after it is encoded by the graphic encoding software of the terminal 1, one or more images may be generated, and the size of each image is related to the resolution and the color gradation index of the display screen of the terminal. If more than one image is generated by the terminal 1, an image frame switch is performed on the display screen at a predetermined frequency.

In an embodiment of the present invention, bmp graphic encoding software is installed on the terminal 1, and the image(s) generated by encoding by the terminal 1 may be displayed on the display screen of the terminal 1 in the form of bitmap.

In the generated image(s), starting from the top left corner, a point in a first row and a first column is pixel 1, a point in a first row and a second column is pixel 2, and the like. Each pixel may display red color, green color, blue color and a combination thereof, and the range of color gradation value of each color is [0, 255].

The terminal 1 encoding binary data of a file to be transmitted to generate image(s) specifically refers to the following contents.

Pixels 1, 2 and 3 in an image are used to carry a color gradation correction code. The terminal 1 encodes binary data of the color gradation correction code of the file to be transmitted, and according to the encoded color gradation correction code data, sets color gradation values of the color gradation correction code on pixels 1, 2 and 3 in the image. The color gradation values of the red, green and blue colors are displayed on pixels 1, 2 and 3 respectively, so as for the terminal 2 to correct color gradation after decoding the image, ensuring consistency between encoding and decoding of the same color by the two terminals transmitting data.

Pixels 4, 5 and 6 in an image are used to carry a check code. The terminal 1 encodes binary data of the check code of the file to be transmitted, and according to the encoded check code data, sets color gradation values of the check code on pixels 4, 5 and 6 in the image, so as for the terminal 2 to perform a check after decoding the image, ensuring consistency between encoding and decoding data.

Pixel 7 in an image is used to carry information on an image number and a total number of images. The terminal 1 encodes binary data of the image number and the total number of images of the file to be transmitted, and according to the encoded data of the image number and the total number of images, sets on pixel 7 in the image the color gradation value of the image number and the total number of images, for representing the total number of images generated and the position of a current image relative to all images (for example, the image is the $m_{th}$ image out of all n images). Pixel 7 in the image may also be used to carry only information on the image number. The terminal 1 encodes binary data of the image number of the file to be transmitted, and according to the encoded image number data, sets the color gradation value of the image number on pixel 7 in the image, so as for the terminal 2 to piece together multiple binary data generated by decoding the image(s), according to the image numbers.

Pixels 8 to 172800(172793 pixels in total) in an image are used to carry file data of the file to be transmitted. The terminal 1 encodes the file binary data of the file to be transmitted, and according to the encoded file data, sets the color gradation value of the file data on pixel 7 in the image. In addition, pixel 8 in the image may also be reserved as an extension pixel, for representing an operation instruction (such as, start transmitting, stop transmitting, switch to a next image, etc.), so as for the terminal 2 to, after decoding the image, send a control instruction to the terminal 1 according to the control information to perform an operation on the image.

At step 102, the terminal 2 shoots the display screen of the terminal 1 through a camera, and collects the image(s) displayed on the display screen of the terminal 1.

At step 103, the terminal 2 decodes the collected image(s) to generate binary data.

Specifically, during the process of encoding the file to be transmitted by the terminal 1, besides file data (binary data corresponding to pixels 8 to 172800) of the file to be transmitted, data (binary data corresponding to pixels 1-7) for representing various attributes is also generated at respective pixel positions. Therefore, when decoding the collected image(s), not only the file data, but also the abovementioned data representing attributes needs to be decoded. That is to say, the terminal 2 decodes pixels 1, 2 and 3 in an image to obtain binary data of the color gradation correction code, decodes pixels 4, 5 and 6 in an image to obtain binary data of the check code, decodes pixel 7 in an image to obtain binary data of the image number (or the image number and the total number of images), and decodes pixels 8-172800 in an image to obtain binary data of the file.

The terminal 2 compares the binary data of the color gradation correction code obtained by decoding with binary data of a standard color gradation (standard color gradation of red, green and blue colors), and calculates color gradation correction differences of pixels 1, 2 and 3. The terminal 2 corrects the binary data (binary data corresponding to pixels 8-172800 of an image) of the file obtained by decoding according to the color gradation correction differences of the three pixels, and obtains the corrected binary data of the file.

Specifically, the corrected binary data of color gradations of various pixels in the image may be obtained through the following formula:

the corrected binary data of color gradation of pixel $n$=binary data of color gradation of pixel $n$+color gradation correction difference of pixel 1+color gradation correction difference of pixel 2+color gradation correction difference of pixel 3;

wherein, color gradation correction difference of pixel 1=binary data of color gradation of pixel 1−binary data of standard color gradation of pixel 1; color gradation correction difference of pixel 2=binary data of color gradation of pixel 2−binary data of standard color gradation of pixel 2; color gradation correction difference of pixel 3=binary data of color gradation of pixel 3−binary data of standard color gradation of pixel 3.

The terminal 2 pieces together the corrected binary data of color gradations of various pixels in the image(s) to obtain the corrected binary data of the file.

In this step, if the terminal 1 encodes the file to be transmitted to generate one image, the terminal 2 decodes the image to obtain binary data of the image; if the terminal 1 encodes the file to be transmitted to generate more than one image, the terminal 2 decodes the more than one image to generate binary data of the more than one image.

At step 104, the terminal 2 calculates a check code from binary data of the file obtained by decoding, and compares the calculated check code with check code data of the collected image, if they match, step 103 is performed; otherwise, step 105 is performed.

Specifically, the terminal 2 obtains binary data of the check code by decoding according to pixels 4, 5 and 6 in the image, and calculates the check code by utilizing a binary radix-minus-one complement sum algorithm, that is, the terminal 2 sets binary data of the check code field (binary data corresponding to pixels 4, 5 and 6) to 0, performs binary radix-minus-one complement and summation operations on every 16 bits of binary data corresponding to pixels 1-172800, and if the numerical value of the check code exceeds the hexadecimal 0x0000-0x3fff range, its radix-minus-one complement is used as the check code; the terminal 2 judges whether the calculated check code matches the check code data of the collected image (binary data of color gradation values of the check code corresponding to pixels 4, 5 and 6), if yes, it indicates that the decoded file is consistent with the file before encoding, and step 105 is performed; if not, it indicates that the decoded file is not consistent with the file before encoding, and step 103 is performed (that is, the terminal 2 re-decodes the collected image).

At step 105, the terminal 2 judges whether the currently collected image is a last image, if yes, step 106 is performed, otherwise, step 108 is performed;

Specifically, the terminal 2 may judge whether the currently collected image is a last image according to information carried by pixel 7 in the image. For example, if the terminal 2 judges that binary data of the image number and binary data of the total number of images obtained by decoding pixel 7 in the image are equal, it indicates that this image is the last image (comprising: the cases where only one image is generated by encoding by the terminal 1, and where the current image is the last image of the more than one image generated), and step 106 is performed. If the terminal 2 judges that binary data of the image number and binary data of the total number of images obtained by decoding pixel 7 in the image are not equal, it indicates that the currently collected image is not the last image, and step 107 is performed.

At step 106, the terminal 2 restores the corresponding file according to the binary data generated by decoding the image(s).

Specifically, if the terminal 1 encodes the file to be transmitted to generate one image, the terminal 2 decodes the image, and the obtained binary data of the image is the binary data of the corresponding file (the file to be transmitted); if the terminal 1 encodes the file to be transmitted to generate more than one image, the terminal 2 decodes the more than one image generated to generate multiple binary data of the file, and according to binary data of the image numbers obtained by decoding pixels 7 in the images and binary data of the file obtained by decoding pixels 8-172800 in the images, pieces together the multiple binary data of the file in accordance with the image numbers, and restores the corresponding file, thus achieving transmitting data (the file to be transmitted) from the terminal 1 to the terminal 2.

After restoring the corresponding file, the terminal 2 closes the graphic decoding software, and sends an audio signal to notify the terminal 1 to close the graphic encoding software. Preferably, the terminal 2 sends the audio signal to the terminal 1 via a speaker to notify the terminal 1 of completion of file transmission, and the terminal 1 closes the graphic encoding software after receiving the audio signal via a microphone. The audio signal may be an acoustic signal (20 Hz-20000 Hz) that is audible to human ears, and preferably, may also be an ultrasonic signal higher than 20000 Hz, which may avoid the production of noise and apply to conditions with higher environmental requirement.

At step 107, the terminal 2 sends a signal to the terminal 1, for requesting the terminal 1 to display a next image on the display screen and step 102 is performed.

Specifically, the terminal 2 sends an audio signal to the terminal 1 via a speaker, requesting the terminal 1 to switch to the next image, and the terminal 1, after receiving the audio signal, displays the next image on the display screen, so that the camera of the terminal 2 may collect the next image. The audio signal may be an acoustic signal (20 Hz-20000 Hz) that is audible to human ears, and preferably, may also be an ultrasonic signal higher than 20000 Hz.

In the data transmission procedure provided by an embodiment of the invention, when encoding the file to be transmitted, the terminal 1 may only encode the data of the file to be transmitted, that is, the data of the file to be transmitted is carried by pixels 8-178200 in the image(s), and may also encode it in combination with the color gradation correction code, the check code, the image number and the total number of images, or a combination thereof, respectively. Accordingly, when decoding the collected image(s), the terminal 2 decodes corresponding pixels according to the encoding by the terminal 1.

If the terminal 1 does not encode the check code, step 104 is omitted, that is, the terminal 2 decodes pixels 8-172800 in the image(s) to obtain binary data of the file, and pixel(s) 7 of the image(s) to obtain binary data of the image number(s) (when encoding by the terminal 1, pixel(s) 7 only include(s) information on the image number(s)), and according to the binary data of the image number(s), restores the corresponding file from the obtained binary data of the file.

If the terminal 1 does not encode the image number and the total number of images, then in step 105, the terminal 1 presets a display period for displaying images, for example, setting 5S as a display period, and switching to a next image every 5S, and the terminal 2 may set a threshold (the threshold is larger than the display period), such as 8S, and when the terminal 2 fails to collect a next image for more that 8S after collecting an image, it may be determined that the image is a last image.

If the terminal 1 does not encode the color gradation correction code, then in step 103, the process of color gradation correction is omitted, and the binary data of the file is directly obtained by decoding the collected binary data of color gradations of pixels 8-172800 of the image(s).

In an embodiment of the present invention, taking a 480×360 pixels, 18-bit true color display screen at a switch rate of 2 frames per second as example, a theoretical transmission rate may reach: $(480\times360-8)\times18\times2=6220512\approx6.22$ Mbit/s. If a 960×720 pixels, 18-bit true color display screen at a switch rate of 2 frames per second is employed, a theoretical transmission rate may reach: $(960\times720-8)\times18\times2=24882912\approx24.9$ Mbit/s, which is far higher than the transmission rate of dozens of Kbits/s of the prior transmission means, such as Bluetooth, etc.

The solutions for data transmission according to embodiments of the present invention is not merely limited to application between two mobile phones, but may be applied between any terminals conforming to the basic configurations, such as between a computer and a mobile phone, between a mobile phone and a television, etc.

According to the method and device for data provided by embodiments of the present invention, a terminal encodes binary data of a file to be transmitted to generate image(s) and displays the image(s) displayed on a display screen, wherein a plurality of color gradations of pixels of the image(s) correspond to corresponding binary data, and an opposite terminal, after collecting the image(s) through an image collecting module, decodes the image(s), to obtain binary data, and restores the corresponding file according to the obtained binary data, thus achieving data transmission between terminals. Embodiments of the present invention do not require any extra communication module to be added to the terminal, saving manufacturing costs; and by collecting image(s) through an image collecting module, avoid the problems of electromagnetic radiation and electromagnetic interference caused by the prior Bluetooth and Wi-Fi transmission means, making operations more convenient and more effective.

Figures 2, 3:
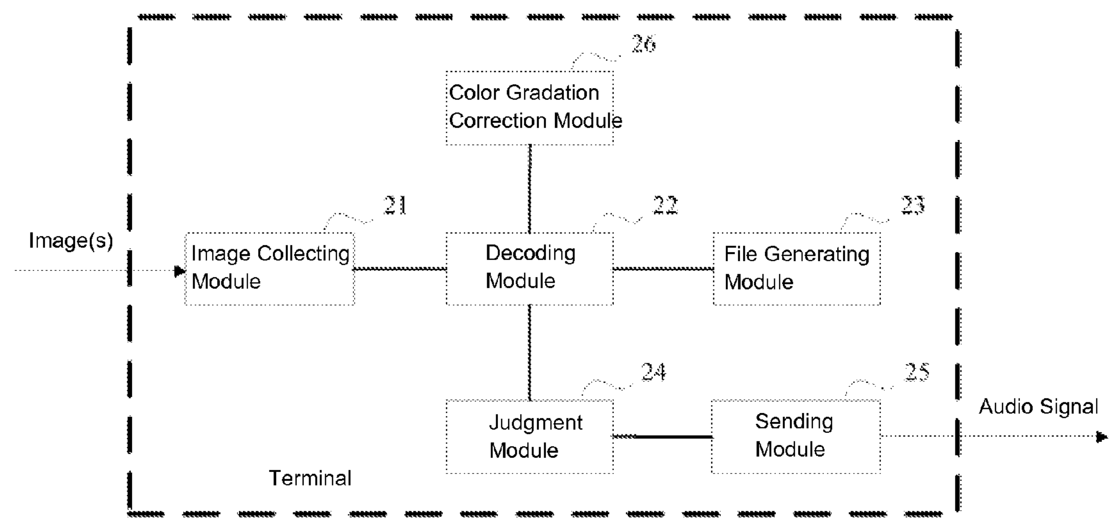
FIG. 2 illustrates one structure diagram of a terminal device provided by an embodiment of the present invention.
FIG. 3 illustrates another structure diagram of a terminal device provided by an embodiment of the present invention.

Based on the same conception, an embodiment of the present invention also provides a terminal, as shown in FIG. 2, which comprises the following contents.

An image collecting module 21 is configured to collect image(s) displayed on a display screen of an opposite terminal, wherein the image(s) is (or are) generated by encoding binary data of a file to be transmitted by the opposite terminal, and displayed on the display screen of the opposite terminal, and wherein a plurality of color gradations of pixels of the image(s) correspond to corresponding binary data.

A decoding module 22 is configured to decode the image(s) collected by the image collecting module 21 to obtain binary data.

A file generating module 23 is configured to restore the corresponding file according to the binary data obtained by the decoding module 22.

The decoding module 22 is specifically configured to decode pixel(s) for carrying a check code at set positions of an image to obtain binary data of the check code, and to decode pixels for carrying file data at set positions of the image to obtain binary data of the file.

The file generating module 23 is specifically configured to check the binary data of the file according to the binary data of the check code obtained by decoding by the decoding module 22, and after passing the check, restores the corresponding file according to the binary data of the file.

The decoding module 22 is specifically configured to decode pixel(s) for carrying an image number and a total number of images at set position(s) of an image to obtain binary data of the image number and the total number of images, and to decode pixels for carrying file data at set positions of the image to obtain binary data of the file.

The terminal also comprises a judgment module 24 and a sending module 25. The judgment module 24 is configured to judge whether the currently collected image is a last image, according to the binary data of the image number and the total number of images obtained by decoding by the decoding module 22.

The sending module 25 is configured, when the judgment module 24 judges that the currently collected image is not a last image, to send a signal to the opposite terminal to request the opposite terminal to display a next image.

The decoding module 22 is specifically configured to decode pixel(s) for carrying a image number at set position(s) of an image to obtain binary data of the image number, and to decode pixels for carrying the file data at set positions of the image to obtain the binary data of the file.

The file generating module 23 is specifically configured to restore the file in accordance with the image numbers, according to the binary data of the image numbers and the binary data of the file, which are obtained by decoding by the decoding module 22.

The decoding module 22 is specifically configured to decode pixel(s) for carrying a color gradation correction code at set position(s) of the image to obtain binary data of the color gradation correction code, and to decode pixels for carrying the file data at set positions of the image to obtain the binary data of the file.

The terminal also comprises a color gradation correction module 26, which is configured to correct the binary data of the file obtained by decoding by the decoding module 22, according to a color gradation correction difference between the binary data of the color gradation correction code obtained by decoding by the decoding module 22 and binary data of standard color gradation, so as to obtain the corrected binary data of the file.

Based on the same conception, an embodiment of the present invention also provides a terminal, as shown in FIG. 3, which comprises the following contents.

An encoding module 31 is configured to encode binary data of a file to be transmitted, and generate image(s) according to an encoding result, wherein a plurality of color gradations of pixels of the image(s) correspond to corresponding binary data.

A display module 32 is configured to display the image(s) generated by the encoding module 31 on a display screen, so as that an opposite terminal collects the image(s) through an image collecting module, obtains binary data by decoding the collected image(s), and restores the corresponding file according to the binary data obtained by decoding.

The encoding module 31 is specifically configured to encode binary data of a check code of the file to be transmitted and binary data of the file to be transmitted, and to set color gradation value(s) of pixel(s) for carrying the check code at set position(s) of the image according to the encoded check code data, and set color gradation values of pixels for carrying the file data at set positions of the image according to the encoded file data.

The encoding module 31 is specifically configured to encode binary data of an image number and a total number of images of the file to be transmitted and binary file data of the file to be transmitted, and to set color gradation values of a pixel for carrying the image number and the total number of images at a set position of the image according to the encoded data of the image number and the total number of images, and set color gradation values of pixels for carrying the file data at set positions of the image according to the encoded file data.

The encoding module 31 is specifically configured to encode binary data of an image number of the file to be transmitted and binary file data of the file to be transmitted, and to set color gradation value(s) of pixel(s) for carrying the image number at set position(s) of the image according to the encoded image number data, and set color gradation values of pixels for carrying the file data at set positions of the image according to the encoded file data.

The display module 32 is specifically configured to perform an image frame switch on the display screen at a predetermined frequency if the encoding module 31 generates more than one image.

The encoding module 31 is specifically configured to encode binary data of a color gradation correction code of the file to be transmitted, and binary file data of the file to be transmitted, and to set color gradation value(s) of pixel(s) for carrying the color gradation correction code at set positions of the image according to the encoded data of the color gradation correction code, and set color gradation values of pixels for carrying the file data at set positions of the image according to the encoded file data.

Figure 4:
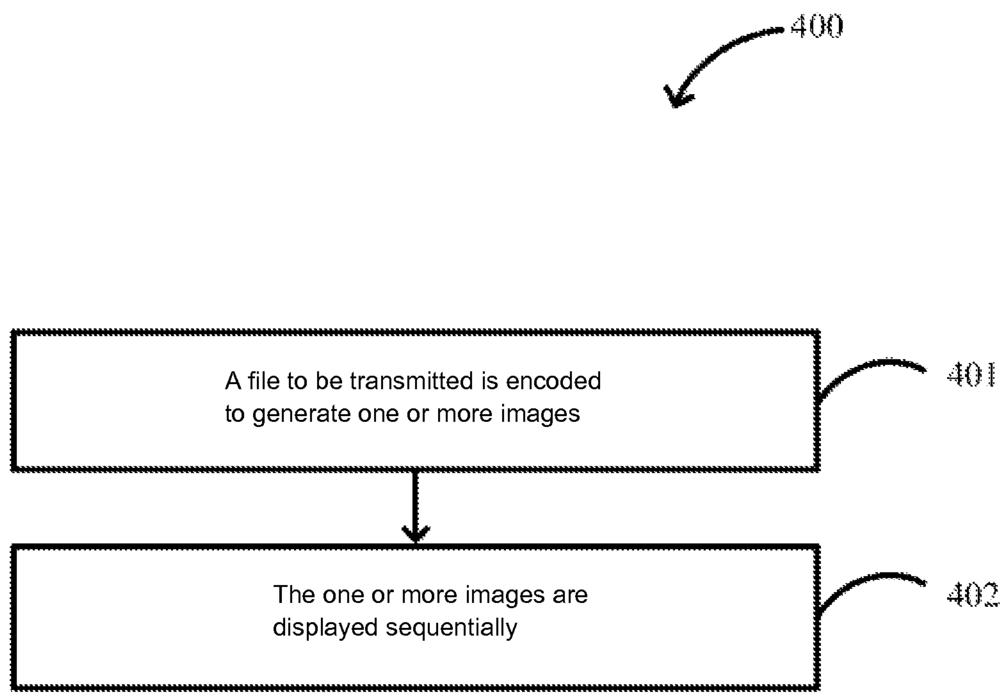
FIG. 4 illustrates a flow chart of a method for outputting a file according to an embodiment of the present invention.

In an embodiment, a method for outputting a file is provided. FIG. 4 illustrates a flow chart of a method 400 for outputting a file according to an embodiment of the present invention. As shown in FIG. 4, the method 400 comprises the following steps.

At step 401, a file to be transmitted is encoded to generate one or more images. The file to be transmitted is similar to a file to be transmitted in the foregoing embodiments. Persons skilled in the art may understand the file to be transmitted by referring to the foregoing embodiments, and no more further detail will be herein provided. In an embodiment, encoding software may be employed to encode the file to be transmitted. The encoding mode may be any suitable encoding mode. In an embodiment of the present invention, according to the size of a file to be transmitted and the amount of data that a single image generated is able to carry, one image may be generated based on the file to be transmitted, or the file to be transmitted may be divided into more than one portion, and more than one image is generated accordingly. In the case where more than one image is generated, each image carries a portion of data information of the file to be transmitted. Each portion of the file to be transmitted corresponding to each image may be encoded, respectively. Preferably, portions of the file to be transmitted corresponding to different images are encoded by following the same encoding rules.

At step 402, the one or more images are displayed sequentially, so that a receiving terminal performs a collecting operation and a decoding operation on each of the one or more images to obtain the decoded data of the one or more images, and obtains the file to be transmitted according to the decoded data of the one or more images. The one or more images may be displayed one at a time on a display screen of an output terminal. The display screen of the output terminal may have any color gradation index, including monochrome, 256 colors (8-bit color), 4096 colors (12-bit color), 65536 colors (16-bit true color), 262144 colors (18-bit true color), etc. The display screen of the output terminal may have any resolution, including 240*320 pixels, 320*480 pixels, 480*360 pixels, 640*480 pixels, 800*480 pixels, 854*480 pixels, 960*540 pixels, 1280*720 pixels, 1920*1080 pixels, etc. In an embodiment of the present invention, the output terminal encodes a file to be transmitted to generate one or more images, and displays the one or more images on a display screen, wherein the combination of the color gradation index and the resolution of the display screen determines the amount of data that a single image is able to carry in full screen mode. Therefore, when both the color gradation index and the resolution of the display screen are relatively high, the amount of data that a single image is able to carry is relatively large, and thus the number of images generated is relatively small. Conversely, when both the color gradation index and the resolution of the display screen are relatively low, the amount of data that a single image is able to carry is relatively small, and thus the number of images generated is relatively large.

By the abovementioned output method, a file may be output without requiring any extra communication module to be added to the output terminal, saving manufacturing costs. In addition, the problems of electromagnetic radiation and electromagnetic interference caused by the prior methods for outputting a file, such as Bluetooth, Wi-Fi, etc., may be avoided, making operations more convenient and more effective.

The process for encoding a file to be transmitted will be described in detail as follows.

In an embodiment, the encoding a file to be transmitted to generate one or more images comprises: setting color gradation values of corresponding pixels in the one or more images according to data fragments of the file to be transmitted. According to the length of binary data that each pixel in the generated image(s) is able to carry, the file to be transmitted may be divided into appropriate data fragments. For example, if the length of binary data that each pixel in the generated image(s) is able to carry is 18 bits, the file to be transmitted is divided into a plurality of data fragments, each of which is 18 bits long. If the length of the last data fragment of the file to be transmitted is shorter than 18 bits, additional code(s) 0 or 1 may be added at the lower bits to make the length of the last data fragment equal to 18 bits. Then, a color gradation value of a predetermined pixel in the last image may be set. The predetermined pixel carries the length of the additional code(s) and information on its start position in the last data fragment. Then, according to each data fragment, a color gradation value of a corresponding pixel in the image is set, so that the color gradation value of the corresponding pixel is equal to the data fragment of the file to be transmitted. The color gradation value may be from a group consisting of a red color gradation value, a green color gradation value, and a blue color gradation value. The range of color gradation value of each color may be [0, 63]. Setting a color gradation value of a corresponding pixel as equal to a data fragment of the file to be transmitted does not require any further processing of the file to be transmitted, and therefore, the method is simple and efficient, and can offer faster transmission of the file to be transmitted.

In an embodiment, the encoding a file to be transmitted to generate one or more images further comprises: for each of the one or more images, setting a color gradation value of each of one or more predetermined pixels for carrying a color gradation correction code, according to a standard color gradation value. As discussed above, the predetermined pixels may be pixel 1, 2 and 3 in the image. The standard color gradation may be pure red, pure green or pure blue color gradation (for example, in the case of an 18-bit true color display screen, its values are 3f0000, 003f00 and 00003f, respectively). The color gradation values of pixels 1, 2 and 3 may be set as the color gradation values of the three colors of pure red, pure green and pure blue respectively. Optionally, the predetermined pixels for carrying the color gradation correction code may be located at any suitable positions in the image. The standard color gradation may be any other suitable color gradation. The color gradation correction code is used to correct data fragments carried by pixels in an image when the receiving terminal decodes the image.

In an embodiment, the encoding a file to be transmitted to generate one or more images further comprises: for each of the one or more images, setting a color gradation value of each of one or more predetermined pixels for carrying a check code, which is obtained by calculating data fragments corresponding to color gradation values of other pixels. Other pixels refer to other pixels in the image than those corresponding to the check code. The check code is used for the receiving terminal to check data fragments carried by pixels in an image when decoding the image. In an embodiment, when the data fragments corresponding to the color gradation values of other pixels in the image are determined, a checksum of the data fragments corresponding to the color gradation values of other pixels is calculated, and set as the value of the check code. As described above, the color gradation values of pixels 4, 5 and 6 in the image may be set as equal to the check code. The color gradation value of any other suitable pixel may also be set as equal to the check code. The check code facilitates consistency between the ultimate file obtained by the receiving terminal after the decoding process and the file to be transmitted.

In an embodiment, the encoding a file to be transmitted to generate one or more images further comprises: for each of the one or more images, setting a color gradation value of each of one or more predetermined pixels for carrying an image number. The image number is used for the receiving terminal to, during the decoding, sequence data fragments obtained from various images for piecing together the data fragments in a correct order.

In an embodiment, the encoding a file to be transmitted to generate one or more images further comprises: for each of the one or more images, setting a color gradation value of each of one or more predetermined pixels for carrying an identifier, which is used for identifying whether an image to which it belongs is a last image. The identifier facilitates a prompt judgment on a last image, avoiding unnecessary operations. In an example, the identifier may include an image number and a total number of images. The image number and the total number of images may be used to represent the total number of images generated and the position of a current image among all images. According to the image number and the total number of images, it may be judged whether the current image is the last image. In another example, the identifier may simply be 0 or 1. In this example, 0 may denote that the current image is not the last image, whereas 1 may denote that the current image is the last image, or vice versa. The identifier may also be used to identify other information. For example, the identifier may denote the start of a transmission. As discussed above, pixel 7 in an image may be set such as to carry the identifier. The color gradation value of any other suitable pixel may also be set such as to carry the identifier.

In an embodiment, the encoding a file to be transmitted to generate one or more images further comprises: for each of the one or more images, setting a color gradation value of each of one or more predetermined pixels for carrying a control code. The control code may include some operation instructions for controlling the receiving terminal to perform corresponding operations. As discussed above, the color gradation value of pixel 8 in an image may be set such that pixel 8 carries the control code. The color gradation value of any other suitable pixel may be set such that the pixel carries the control code.

In an embodiment, a next image of a current image is displayed in response to a request for displaying a next image from the receiving terminal. In an embodiment, when the current image is displayed, if the request for displaying a next image is received from the receiving terminal, the next image is displayed. Displaying an image upon a request from the receiving terminal may make sure that the next image is not displayed until the receiving terminal finishes processing the current image, and thus the transmission process is more accurate and more reliable. In another embodiment, more than one image may be displayed sequentially at a fixed frequency. Preferably, the display request may be sent via ultrasonic waves. An ultrasonic signal may avoid the production of noise.

In an embodiment, after sequential display of one or more images, a signal for notifying completion of file transmission is received from the receiving terminal, and display is stopped according to the signal. Preferably, after the display of all images is completed, there is a wait for an instruction from the receiving terminal. When the signal for notifying completion of file transmission is received from the receiving terminal, it indicates that the file transmission has been completed, and therefore, image display may be stopped according to the signal. An image may be redisplayed in circumstances that an error occurs in the transmission process or the receiving terminal fails to obtain the file to be transmitted correctly. Therefore, it facilitates improvement of accuracy of the transmission process image display is stopped according to a signal.

Figure 5:
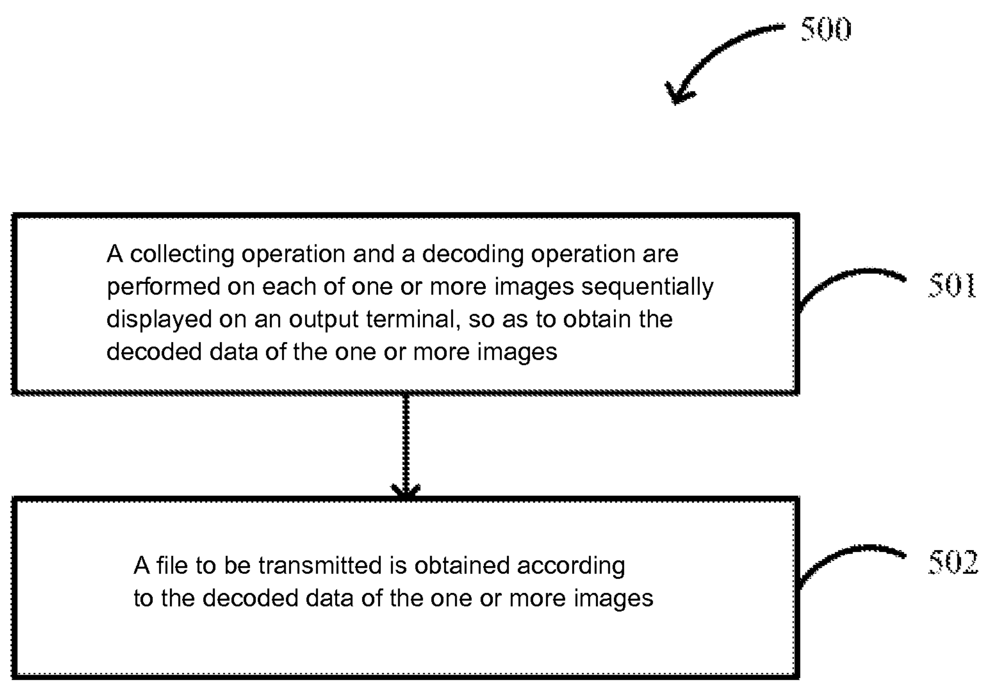
FIG. 5 illustrates a flow chart of a method for transmitting a file according to an embodiment of the present invention.

In an embodiment, the present invention provides a method for transmitting a file. FIG. 5 illustrates a flow chart of a method 500 for transmitting a file according to an embodiment of the present invention. The method 500 comprises the following steps.

At step 501, a collecting operation and a decoding operation are performed on each of one or more images sequentially displayed on an output terminal, so as to obtain the decoded data of the one or more images. The collecting operation may be performed by using a camera. The resolution of the camera needs to meet the requirement of clear distinction of each pixel in each image. For example, the resolution of the camera may be 2 million pixels.

At step 502, a file to be transmitted is obtained according to the decoded data of the one or more images. The one or more images are generated by encoding the file to be transmitted. If only one image is generated by encoding the file to be transmitted, then the decoded data obtained in step 501 is the file to be transmitted. If more than one image is generated by encoding the file to be transmitted, the decoded data comprises the portion of the file to be transmitted corresponding to each image. The file to be transmitted may be obtained by piecing together the portion of the file to be transmitted corresponding to each image. The output terminal is similar to the aforementioned terminal 1, and persons skilled in the art may understand the output terminal by referring to the foregoing description of terminal 1.

The abovementioned transmission method may be implemented without adding any extra communication module to the receiving terminal, saving the manufacturing costs of the receiving terminal. By receiving the file to be transmitted through collecting images, the problems of electromagnetic radiation and electromagnetic interference cause by the prior file transmission means, such as Bluetooth and Wi-Fi, are avoided, making operations more convenient and more effective.

Preferably, a color gradation value of each of at least a portion of pixels in each of the one or more images may be equal to a corresponding data fragment of the file to be transmitted. As described in the encoding process according to the method 400, color gradation values of corresponding pixels in the one or more images may be set according to data fragments of the file to be transmitted. The color gradation value may be from a group consisting of a red color gradation value, a green color gradation value and a blue color gradation value.

During performing step 501, a collecting operation and a decoding operation are performed on each image. In the case where only one image is displayed on the output terminal, the decoded data of the image may be obtained by performing a collecting operation and a decoding operation successively on the image. Whereas in the case where more than one image is displayed on the output terminal, collecting operations and decoding operations on the more than one image may be performed in different orders. The more than one image is divided into at least two groups, for each of which, after the decoding operation on a last image has been completed, the collecting operation on a next image, if any, is started.

Figure 6A:
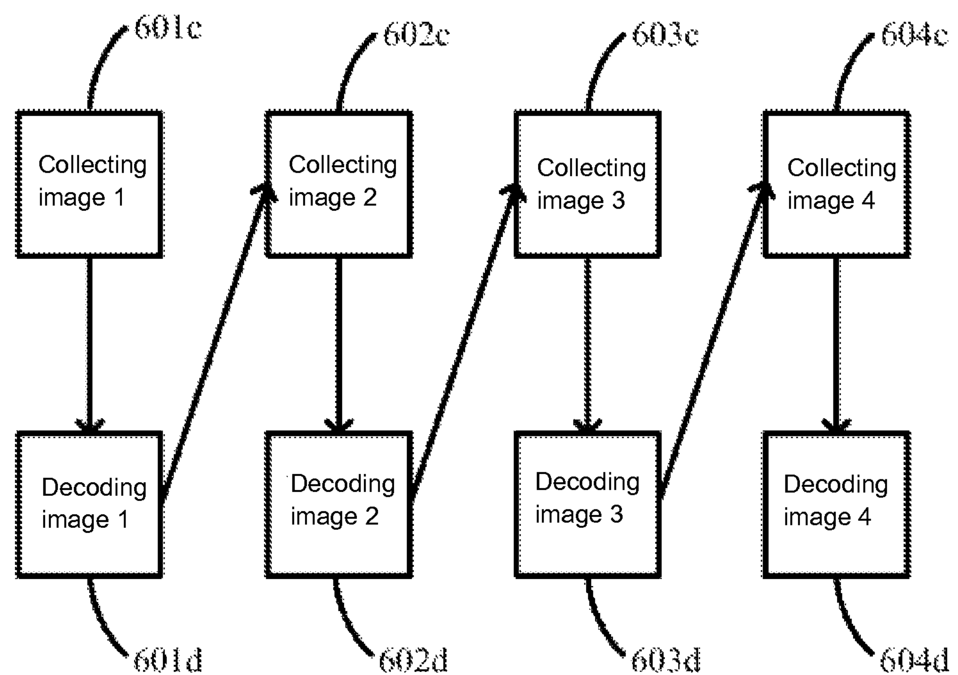
FIG. 6*a* illustrates a sequence for performing collecting operations and decoding operations on four images according to an embodiment of the present invention.

FIG. 6*a* illustrates a sequence for performing collecting operations and decoding operations on four images according to an embodiment of the present invention. In this embodiment, the four images are divided into four groups, each of which includes only one image. As shown in FIG. 6*a*, the following operations are performed on the four images, that is, image 1, image 2, image 3 and image 4, respectively:

At step 601*c*, image 1 is collected; at step 601*d*, image 1 is decoded; at step 602*c*, image 2 is collected; at step 602*d*, image 2 is decoded; at step 603*c*, image 3 is collected; at step 603*d*, image 3 is decoded; at step 604*c*, image 4 is collected; at step 604*d*, image 4 is decoded. The above eight steps are performed successively in the following order: 601*c*→601*d*→602*c*→602*d*→603*c*→603*d*→604*c*→604*d*. That is to say, in this example, only after a collecting operation and a decoding operation on an image are completed, do the collecting and decoding of a next image begin.

Figure 6B:
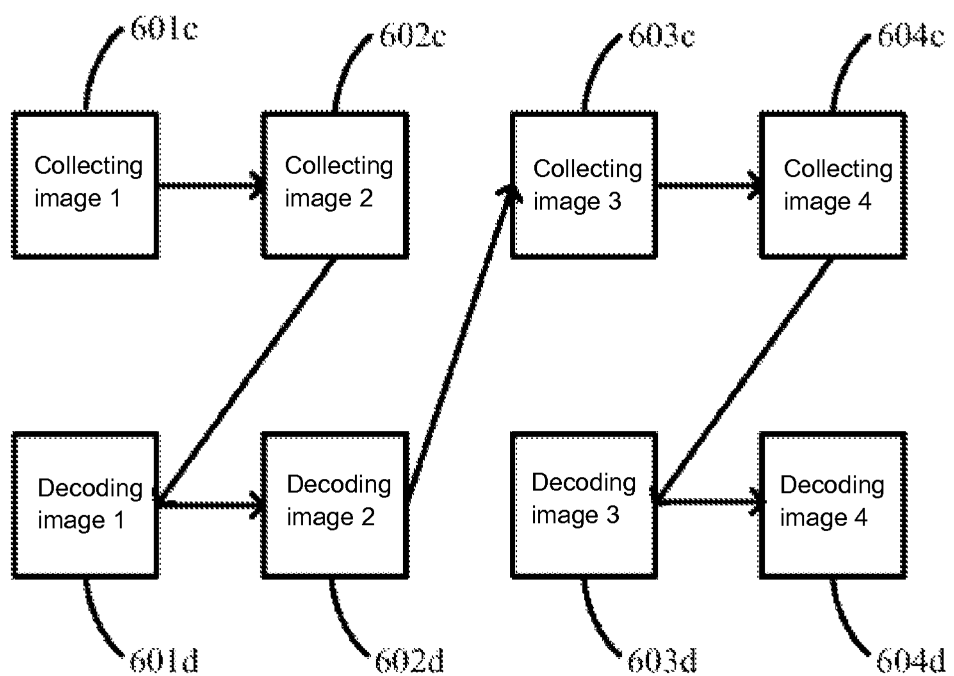
FIG. 6*b* illustrates a sequence for performing collecting operations and decoding operations on four images according to another embodiment of the present invention.

FIG. 6*b* illustrates a sequence for performing collecting operations and decoding operations on four images according to another embodiment of the present invention. As shown in FIG. 6*b*, the collecting operations and the decoding operations on the abovementioned four images are performed successively in the following order: 601*c*→602*c*→601*d*→602*d*→603*c*→604*c*→603*d*→604*d*. In this example, the four images are divided into two groups, with the first group composed of image 1 and image 2, and the second group composed of image 3 and image 4. Firstly, respective collecting operations 601*c* and 602*c* are successively performed on the two images in the first group, and then, respective decoding operations 601*d* and 602*d* are successively performed on the two images. Only after the decoding operations 601*d* and 602*d* are both completed, does the collecting operation 603*c* on image 3 begin. Then, collecting operations and decoding operations are performed on the images in the second group in an order similar to that for the first group.

Figure 6C:
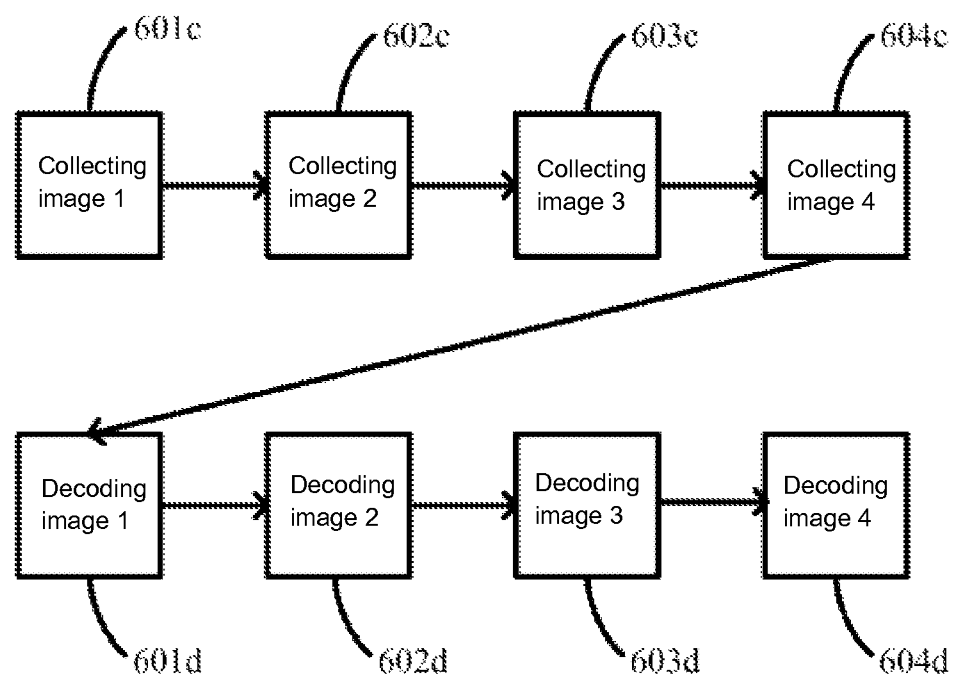
FIG. 6*c* illustrates a sequence for performing collecting operations and decoding operations on four images according to still another embodiment of the present invention.

FIG. 6*c* illustrates a sequence for performing collecting operations and decoding operations on four images according to still another embodiment of the present invention. As shown in FIG. 6*c*, the collecting decoding and the decoding operations on the abovementioned four images are performed successively in the following order: 601*c*→602*c*→603*c*→604*c*→601*d*→602*d*→603*d*→604*d*. In this example, firstly collecting operations are performed on all images. Only after the collecting operation on the last image is completed, does the decoding of the first image begin.

In an embodiment, for each of the one or more images, the decoding operation comprises the following steps. A color gradation correction code is obtained according to a color gradation value of each of one or more predetermined pixels for carrying the color gradation correction code; and corresponding data fragments is obtained according to color gradation values of other pixels. The color gradation correction code and the corresponding data fragment are corrected, according to a correction difference between the color gradation correction code and a standard color gradation. For example, the color gradation correction code is corrected with the standard color gradation (color gradation of the three colors, pure red, pure green and pure blue), and color gradation correction differences of pixels 1, 2 and 3 are calculated. According to the color gradation correction differences of the three pixels, data fragments corresponding to color gradation values of pixels in an entire image are corrected.

Specifically, for pixel n, the corrected color gradation value may be obtained through the following formula:

the corrected color gradation value of pixel $n$=color gradation value of pixel $n$−color gradation correction difference of pixel 1−color gradation correction difference of pixel 2−color gradation correction difference of pixel 3;

wherein, color gradation correction difference of pixel 1=color gradation value of pixel 1=standard color gradation of pixel 1; color gradation correction difference of pixel 2=color gradation value of pixel 2−standard color gradation of pixel 2; color gradation correction difference of pixel 3=color gradation value of pixel 3−standard color gradation of pixel 3.

In an embodiment, for each image in each group, the decoding operation comprises the following steps. A check code is obtained according to a color gradation value of each of one or more predetermined pixels for carrying the check code, and corresponding data fragments are obtained according to color gradation values of other pixels. The corresponding data fragments are checked according to the check code, so as to re-perform the collecting operation on each image in the current group if failing to pass the check. The method for checking the data fragments corresponding to color gradation values of other pixels by using the check code is similar to the check method according to the foregoing embodiments, and no more detail will be herein provided. When failing to pass the check, it indicates an error occurring in the transmission process, such as color distortion, etc. In this embodiment, in the case of a failure to pass the check, the collecting operation may be re-performed. The check process will be hereby described by referring to FIGS. 6*a*-6*c*. For example, in FIG. 6*a*, if failing to pass the check when decoding image 1, only the collecting of image 1 needs to be re-performed. In FIG. 6*b*, if failing to pass the check when decoding image 1, the collecting of both image 1 and image 2 needs to be re-performed. In FIG. 6*c*, if failing to pass the check when decoding image 1, the collecting of images 1, 2, 3 and 4 need to be re-performed. Therefore, the more groups there are, the fewer the images which need to be re-collected are.

In an embodiment, the method 500 further comprises: sending a request for displaying a next image to the output terminal after completion of the decoding operation on a last image of each group, during the performing process. Please refer to FIGS. 6*a*-6*c*. In FIG. 6*a*, when each of 601*d*, 602*d*, 603*d* and 604*d* is completed, a request for displaying a next image is sent to the output terminal. Correspondingly, the output terminal displays image 2, image 3 and image 4, respectively. Image 4 is the last one of all images. Therefore, although a request for displaying a next image is sent to the output terminal upon completion of 604*d*, the output terminal may not display any image. In another embodiment, when the decoding operation on the last one of all images is completed, the request for displaying a next image may not sent to the output terminal. Preferably, the request is sent via ultrasonic waves.

In an embodiment, each of the one or more images comprises one or more predetermined pixels for carrying an identifier, which is used for identifying whether an image to which it belongs is a last image. The identifier may include an image number and a total number of images. Persons skilled in the art may understand the identifier by referring to the foregoing embodiments, and no more detail will be herein provided. Preferably, the request is sent based on the identifier. When the identifier identifies that a current image is not the last image, a request for displaying a next image may be sent to the output terminal. When the identifier identifies that the current image is the last image, a request for displaying a next image may not be sent to the output terminal.

In an embodiment, the method 500 further comprises: sending a signal for notifying completion of file transmission to the output terminal after obtaining the file to be transmitted according to the decoded data of the one or more images, so that the output terminal stops display according to the signal. The signal for notifying completion of file transmission has been explained in the description of the embodiment of the method 400, and no more detail will be herein provided.

In the method 400, color gradation values of corresponding pixels in the image may be set merely according to data fragments of the file to be transmitted. The color gradation values of the corresponding pixels in the image may also be set by combining one of a color gradation correction code, a check code, and an identifier, or any combination thereof, respectively. Accordingly, in the method 500, corresponding pixels may be decoded according to the encoding. In the decoding operation according to the method 500, the step of performing a correction with a color gradation correction code precedes the step of performing a check with a check code. In addition, persons skilled in the art would understand that, in the process of encoding a file to be transmitted according to the method 400, the file to be transmitted may be encrypted, compressed, etc. Accordingly, in the process of decoding one or more images according to the method 500, the one or more images may be decrypted, decompressed, etc.

In an embodiment, the present invention provides a receiving terminal comprising a camera and a processor. The camera is configured to perform a collecting operation on each of one or more images sequentially displayed on an output terminal. The processor is configured to perform a decoding operation on each of the one or more images, so as to obtain the decoded data of the one or more images. The processor is further configured to obtain a file to be transmitted according to the decoded data of the one or more images. The one or more images are generated by encoding the file to be transmitted.

In an embodiment, the present invention provides an output terminal comprising a processor and a display screen. The processor is configured to encode a file to be transmitted to generate one or more images. The display screen is configured to sequentially display the one or more images, so that a receiving terminal performs a collecting operation and a decoding operation on each of the one or more images to obtain the decoded data of the one or more images, and obtains the file to be transmitted according to the decoded data of the one or more images.

Those of ordinary skill in the art would understand that the abovementioned processor may be configured to perform additional steps of the abovementioned corresponding method. For the sake of brevity, no further description of the additional functions of the processor will be herein provided.

In an embodiment, the present invention provides a non-transitory computer program product comprising executable program code for transmitting a file. The executable program code is operable to: when being executed, perform a collecting operation and a decoding operation on each of one or more images sequentially displayed on an output terminal, so as to obtain the decoded data of the more or more images. Further, the executable program code is operable to: when being executed, obtain a file to be transmitted according to the decoded data of the one or more images. The one or more images are generated by encoding the file to be transmitted.

In an embodiment, the present invention provides a non-transitory computer program product comprising executable program code for outputting a file. The executable program code is operable to: when being executed, encode a file to be transmitted to generate one or more images. Further, the executable program code is operable to: when being executed, sequentially display the one or more images, so that a receiving terminal performs a collecting operation and a decoding operation on each of the one or more images to obtain the decoded data of the one or more images, and obtains the file to be transmitted according to the decoded data of the one or more images.

Those of ordinary skill in the art would understand that the abovementioned executable program code is further operable to, when being executed by a processor, perform all steps of the abovementioned corresponding methods. For the sake of brevity, no further description of the additional functions of the executable program code will be provided. It should be noted that the code may directly enable the processor to perform a specified operation, be compiled to enable the processor to perform a specified operation, and/or be combined with other software, hardware and/or firmware (such as a library for performing standard functions) to enable the processor to perform a specified operation.

Persons skilled in the art would understand that modules of a device in an embodiment may be distributed in the device in this embodiment according to the description of this embodiment, and may also be changed correspondingly to be located in one or more devices different from that in this embodiment. The modules in the abovementioned embodiments may be combined into one module, or may also be further divided into a plurality of sub-modules.

Through the above description of embodiments, persons skilled in the art would be well aware that the present invention may be achieved by means of software plus necessary universal hardware platform, and may also be achieved by hardware; however, the former may be a better implementation in many cases. Based on such understanding, the technical solutions of the present disclosure, in essence, or as far as the portion contributing to the prior art, may be embodied in a software product. The computer software product is stored in a storage medium, including several instructions for enabling a terminal device (which may be a mobile phone, a personal computer, a server, or a network device, etc.) to implement the methods described in various embodiments of the present invention.

The above description only relates to preferred embodiments of the present invention. It should be noted that some improvement and polish may be made without departing from the principle of the present invention. Such improvement and polish shall also be deemed to fall into the scope of protection claimed by the present invention.

What is claimed is:

1. A method for transmitting a file, comprising:

performing a collecting operation and a decoding operation on each of one or more images sequentially displayed on an output terminal, so as to obtain the decoded data of the one or more images; and obtaining a file to be transmitted according to the decoded data of the one or more images;

wherein, the one or more images are generated by encoding the file to be transmitted, and wherein the more than one image is divided into at least two groups, for each of which, after the decoding operation on a last image has been completed, the collecting operation on a next image, if any, is started.

2. The method according to claim 1, wherein a color gradation value of each of at least a portion of pixels in each of the one or more images is equal to a corresponding data fragment of the file to be transmitted.

3. The method according to claim 2, wherein the color gradation value is from a group consisting of a red color gradation value, a green color gradation value and a blue color gradation value.

4. The method according to claim 1, wherein, for each image in each group, the decoding operation comprises:

obtaining a check code according to a color gradation value of each of one or more predetermined pixels for carrying the check code; obtaining corresponding data fragments according to color gradation values of other pixels; and checking the corresponding data fragments according to the check code, so as to re-perform the collecting operation on each image in the current group if failing to pass the check.

5. The method according to claim 1, wherein the method further comprises:

during the performing process, sending a request for displaying a next image to the output terminal after completion of the decoding operation on a last image of each group.

6. The method according to claim 5, wherein, each of the one or more images comprises one or more predetermined pixels for carrying an identifier, which is used for identifying whether an image to which it belongs is a last image, and the request is sent based on the identifier.

7. The method according to claim 6, wherein the identifier comprises an image number and a total number of images.

8. The method according to claim 1, wherein, for each of the one or more images, the decoding operation comprises:

obtaining a color gradation correction code according to a color gradation value of each of one or more predetermined pixels for carrying the color gradation correction code; obtaining corresponding data fragments according to color gradation values of other pixels; and correcting the color gradation correction code and the corresponding data fragment, according to a correction difference between the color gradation correction code and a standard color gradation.

9. The method according to claim 1, wherein, the method further comprises: sending a signal for notifying completion of file transmission to the output terminal after obtaining the file to be transmitted according to the decoded data of the one or more images, so that the output terminal stops display according to the signal.

10. A method for outputting a file, comprising:

encoding a file to be transmitted to generate one or more images; and sequentially displaying the one or more images, so that a receiving terminal performs a collecting operation and a decoding operation on each of the one or more images to obtain the decoded data of the one or more images, and obtains the file to be transmitted according to the decoded data of the one or more images; and wherein the encoding a file to be transmitted to generate one or more images comprises: for each of the one or more images, setting a color gradation value of each of one or more predetermined pixels for carrying a color gradation correction code, according to a standard color gradation value.

11. The method according to claim 10, wherein the encoding a file to be transmitted to generate one or more images comprises:

setting color gradation values of corresponding pixels in the one or more images according to data fragments of the file to be transmitted.

12. The method according to claim 11, wherein the color gradation value is from a group consisting of a red color gradation value, a green color gradation value, and a blue color gradation value.

13. The method according to claim 10, wherein the encoding a file to be transmitted to generate one or more images comprises: for each of the one or more images, setting a color gradation value of each of one or more predetermined pixels for carrying a check code, which is obtained by calculating data fragments corresponding to color gradation values of other pixels.

14. The method according to claim 10, wherein the encoding a file to be transmitted to generate one or more images comprises: for each of the one or more images, setting a color gradation value of each of one or more predetermined pixels for carrying an identifier, which is used for identifying whether an image to which it belongs is a last image.

15. The method according to claim 14, wherein the identifier comprises an image number and a total number of images.

16. The method according to claim 10, wherein the method further comprises: after sequentially displaying the one or more images, receiving a signal for notifying completion of file transmission from the receiving terminal and stopping display according to the signal.

17. A receiving terminal, comprising:

a camera, configured to perform a collecting operation on each of one or more images sequentially displayed on an output terminal;

a processor, configured to perform a decoding operation on each of the one or more images, so as to obtain the decoded data of the one or more images; and obtaining a file to be transmitted according to the decoded data of the one or more images;

wherein, the one or more images are generated by encoding the file to be transmitted; and wherein the more than one image is divided into at least two groups, for each of which, after the decoding operation on a last image has been completed, the collecting operation on a next image, if any, is started.

* * * * *